F. STRATTON.
AUTOMOBILE BODY.
APPLICATION FILED SEPT. 29, 1910.
1,070,998.
Patented Aug. 19, 1913.
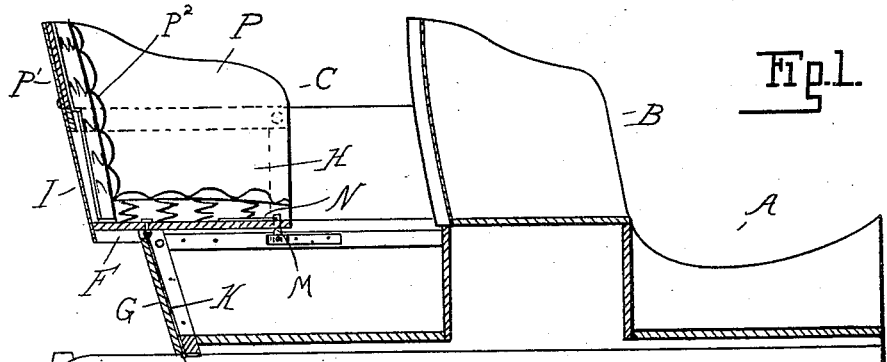
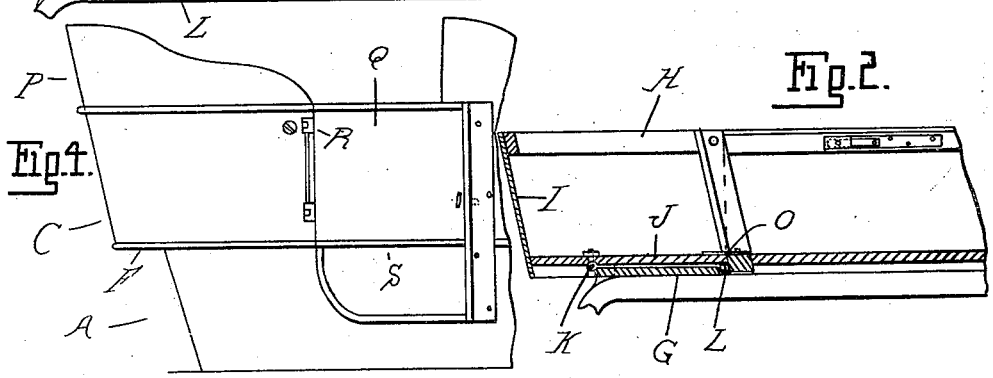
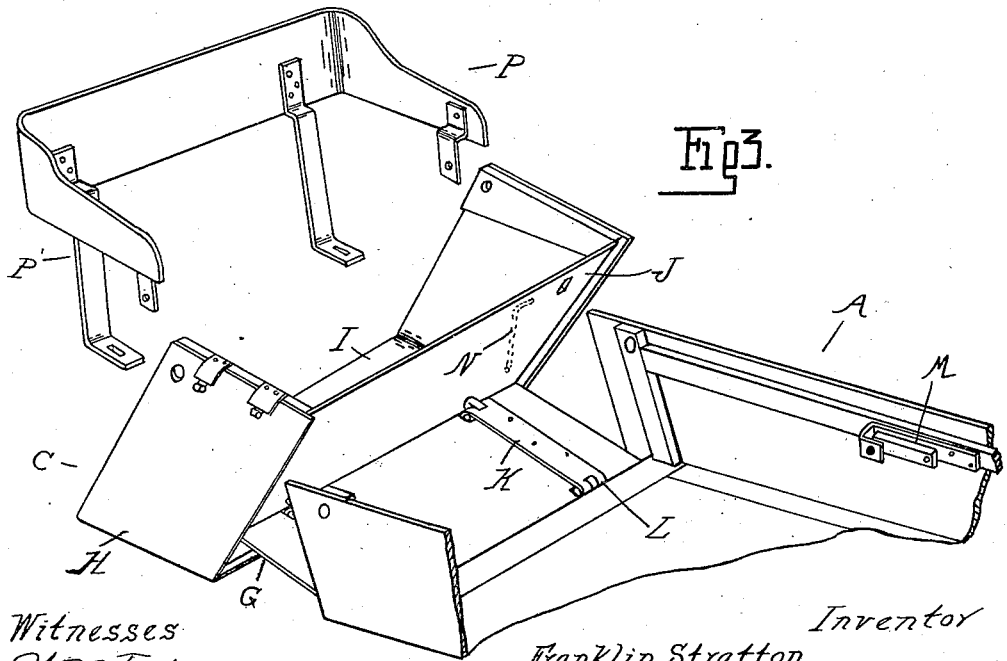
Witnesses
Inventor
Franklin Stratton.

UNITED STATES PATENT OFFICE.

FRANKLIN STRATTON, OF DETROIT, MICHIGAN.

AUTOMOBILE-BODY.

1,070,998.  Specification of Letters Patent.  Patented Aug. 19, 1913.

Application filed September 29, 1910. Serial No. 584,449.

*To all whom it may concern:*

Be it known that I, FRANKLIN STRATTON, a citizen of the United States of America, residing at Detroit, in the county of Wayne and State of Michigan, have made a new and useful Invention in Automobile-Bodies, of which the following is a specification, reference being had therein to the accompanying drawings.

It is the object of the invention to obtain a construction of body for vehicles capable of adjustment to alternatively increase the seating and storage capacity thereof, and the invention consists in the construction as hereinafter set forth.

In the drawings,—Figure 1 is a sectional side elevation of the body showing the adjustment for increased seating capacity; Fig. 2 is a similar view with the parts adjusted to increase the storage capacity; Fig. 3 is a perspective view illustrating the manner of adjustment, and Fig. 4 is a side elevation.

In the present state of the art it is usual to construct bodies of vehicles intended for passenger conveyance, to secure a large seating capacity at the sacrifice of space that might be used for the conveyance of goods. On the other hand where a car is constructed for commercial uses it is usually limited in seating capacity. With my improvement the advantages of both types of construction are secured in a single structure by alternatively employing a portion as a seat or an extension of the body.

In detail, A is the body of the vehicle which may follow the usual lines for a two-seated car.

B is the forward seat in the car and C is the rear seat thereof which is preferably arranged to have a portion F extending slightly in rear of the end-board G of the body. The seat C is formed of side and back portions H and I attached to a bottom portion J and the latter is connected by hinges K to the upper edge of the end-board G of the body. This end-board is also hinged at L to the bottom of the body and the arrangement is such that by swinging the parts upon their hinges, the end-board G may be turned into a horizontal position and the bottom J folded into parallelism therewith, while the sides H are carried into alinement with the sides of the body. This will increase the length of the body adding to the storage capacity thereof, a space equal to that of the seat, while the removal of the seat from the top of the body will provide an opening for the introduction or removal of the goods.

The seat C may be locked in either of its positions of adjustment by suitable means, such as the bolts M and coöperating hooks N for holding the seat in its proper position, and the turn buckle O for holding the parts in the horizontal position of adjustment. The trimmings for the seat are preferably secured to a detachable section P which is provided with a frame P' insertible into the seat frame C and having the back and end trimmings P² secured thereto.

With the construction described, the conversion of the body into one or the other of its forms of adjustment may be effected almost instantaneously and without the use of special tools. Thus the usefulness of the vehicle is greatly increased.

To form a finished appearance the seat C is provided with a door Q extending to the forward seat B. This door is secured by detachable hinges R, and when the seat is adjusted to extend the body, the door is detached therefrom. I preferably provide the door Q with the downward extension S which forms a false door overlapping the side of the body, giving the appearance of the usual lower door arranged in this location.

What I claim as my invention is:

1. The combination with a vehicle body, of an end-board therefor hinged at its lower edge to the bottom of said body, a seat mounted upon said body and having its bottom hinged to the top of said end-board, said bottom of the seat and end-board being foldable into parallelism with the bottom and sides of the seat in alinement with the corresponding parts of the body, and means for holding said seat in each of its positions of adjustment.

2. The combination with a vehicle body, of an end-board for said body hinged to the bottom thereof, a seat hinged to the upper end of said end-board and provided with sides, back and bottom, said sides and bottom being adjustable by the swinging of said end-board into alinement with the corresponding parts of the body, and means for securing said seat in rigid relation to said body in both positions of its adjustment.

3. The combination with a vehicle body, of a member secured thereto alternatively adjustable to form a seat and an extension of the body box, means for securing said seat in each position of adjustment, a second seat forward of said adjustable seat, and a door forming a closure between said seats provided with a downward extension forming a false door overlapping the side of the body.

4. The combination with a vehicle body having sides and an end board, of a seat secured to the end board and provided with sides, a back, and a bottom, said seat and end board being hinged together and foldable to aline the sides and bottom of the seat with the sides and bottom of the body and means for securing said seat in each of its positions of adjustment.

5. The combination with a vehicle body having sides and an end board, of a seat secured to the end board and provided with sides and a back of substantially the same height as the sides of the body portion, and having a bottom, said bottom of the seat and the end board being hinged together and foldable to aline the sides and bottom of the seat with the sides and bottom of the body and means for securing said seat in each of its positions of adjustment.

6. The combination with a vehicle body having sides and an end board, of a seat secured to the end board and provided with sides and a back of substantially the same height as the sides of the body portion, and having a bottom, said bottom of the seat and end board being hinged together and foldable to aline the sides and bottom of the seat with the sides and bottom of the body, and a detachable member of said seat carrying the trimmings therefor and means for securing said seat in each of its positions of adjustment.

7. The combination of a vehicle body and supporting sills, having portions projecting rearwardly beyond the body, of a section of the body adjustably mounted thereupon to alternatively form a seat and a rearward extension of the body, and in its latter position of adjustment being stably supported by the rearward extension of the sills and coöperating with the body to form a delivery car box.

8. The combination with a vehicle body, of a section having a swinging connection to said body and alternatively adjustable to a position above the same for forming a seat facing toward the front of the vehicle and to a position forming a rearward extension of the body, and side sills extending rearwardly of the body and forming a stable support for said section in its extended position.

9. The combination with a vehicle body, of a supporting frame therefor having its sill members projecting rearwardly of the body, and a section stably and removably mounted upon the projecting portions of the sills adapted to form a body extension.

10. The combination of a vehicle body, a front seat, a section adjustably mounted upon the body to alternatively form a rear seat facing toward the front of the vehicle and spaced from the front seat, and an unobstructed rearward extension of the body to increase the carrying capacity thereof, said section in its latter position of adjustment coöperating with the body to form a delivery car box, and means stably supporting said section in each of its positions of adjustment.

11. The combination of a vehicle body including sides and a bottom, a section adjustably mounted upon the body to alternatively form a seat facing toward the front of the vehicle, and an unobstructed rearward extension of the body, said section having a back, sides and a bottom forming in one position of adjustment respectively the back, sides and bottom of the seat, and the sides and bottom of said section forming in the other position of adjustment, extensions respectively of the sides and bottom of the body, and means for stably supporting said section in each of its positions of adjustment.

12. The combination of a vehicle body including sides and a bottom, a front seat, a section adjustably mounted upon the body to alternatively form a rear seat facing toward the front of the vehicle and spaced from the front seat, and an unobstructed rearward extension of the body to increase the carrying capacity thereof, said section comprising a back, side members of substantially the same height as the body sides, and a bottom forming in one position of adjustment respectively the back, sides and bottom of the seat, the sides and bottom of said section forming in the other position of adjustment extensions respectively of the body sides and bottom, and means for stably supporting said section in each of its positions of adjustment.

13. The combination of a vehicle body, a front seat, a section adjustably mounted upon the body to alternatively form a rear seat facing toward the front of the vehicle and spaced from the front seat, and an unobstructed rearward extension of the body to increase the carrying capacity thereof, said section having a back, sides, and a bottom forming respectively the back sides and bottom of the seat, means for stably supporting said section in each of its positions of adjustment, and an extension for increasing the height of the back and sides of said section movable to an inoperative position in the extended relation of said section.

14. The combination of a vehicle body including sides and a bottom, a front seat, a section adjustably mounted upon the body to alternatively form a rear seat facing toward the front of the vehicle and spaced from the front seat, and an unobstructed rearward extension of the body to increase the carrying capacity thereof, said section comprising a back, side members of substantially the same height as the body sides, and a bottom forming in one position of adjustment respectively the back, sides and bottom of the seat, the sides and bottom of said section forming in the other position of adjustment, extensions respectively of the body sides and bottom, means for stably supporting said section in each of its positions of adjustment, and an extension for increasing the height of the back and sides of said section movable to an inoperative position in the extended relation of said section.

15. The combination of a vehicle body including sides and a bottom, a front seat, a section adjustably mounted upon the body to alternatively form a rear seat facing toward the front of the vehicle and spaced from the front seat, and an unobstructed rearward extension of the body to increase the carrying capacity thereof, said section comprising a back, side members of substantially the same height as the body sides, and a bottom forming in one position of adjustment respectively the back, sides and bottom of the seat, the sides and bottom of said section forming in the other position of adjustment extensions respectively of the body sides and bottom, means for stably supporting said section in each of its positions of adjustment, and a door forming a closure for the space between the sides having a downward extension forming a false door overlapping the side of the body.

16. The combination of a vehicle body, supporting sills having portions projecting rearwardly beyond the body, a front seat, a section adjustably mounted upon the body to alternatively form a rear seat facing toward the front of the vehicle and spaced from the front seat, and an unobstructed rearward extension of the body to increase the carrying capacity thereof, said section having a back, sides and a bottom forming the back, sides and bottom of the seat respectively in one position of adjustment, the sides and bottom of said section forming in the other position of adjustment extensions respectively of the sides and bottom of the body, said section in its latter position of adjustment being stably supported by the rearward extensions of the sills.

17. The combination of a vehicle body, a front seat, a section forming an unobstructed rearward extension of the body to increase the carrying capacity thereof and coöperating with the body to form a delivery car box, said section being adjustable forwardly on the body, and a detachable frame coöperating with said section in its forward position of adjustment to form a rear seat facing toward the front and spaced from the front seat, and means stably supporting said section in each of its positions of adjustment.

In testimony whereof I affix my signature in presence of two witnesses.

FRANKLIN STRATTON.

Witnesses:
　W. J. BELKNAP,
　MARION B. FAY.

Copies of this patent may be obtained for five cents each, by addressing the " Commissioner of Patents, Washington, D. C."